United States Patent [19]

Leitner et al.

[11] 3,912,646

[45] Oct. 14, 1975

[54] PRODUCTION OF ACICULAR MAGNETIC IRON OXIDES

[75] Inventors: Lutz Leitner, Rumeln-Kaldenhausen; Franz Hund, Krefeld-Bockum; Jakob Rademachers, Krefeld, all of Germany

[73] Assignee: Bayer Aktiengesellschaft, Leverkusen, Germany

[22] Filed: Dec. 7, 1972

[21] Appl. No.: 313,072

[30] Foreign Application Priority Data

Dec. 17, 1971 Germany............................ 2162716

[52] U.S. Cl. .............. 252/62.56; 423/634; 423/633; 252/62.58; 252/62.59; 252/62.6; 252/62.61; 252/62.62; 252/62.63; 252/62.64
[51] Int. Cl.² .................... C04B 35/00; C01G 49/06
[58] Field of Search........... 252/62.56, 62.58, 62.59, 252/62.6, 62.61, 62.62, 62.63, 62.64; 423/632, 633, 634; 117/235

[56] References Cited
UNITED STATES PATENTS

| | | | |
|---|---|---|---|
| 2,978,414 | 4/1961 | Harz et al. | 117/235 |
| 3,047,428 | 7/1962 | Goto et al. | 423/634 X |
| 3,243,375 | 3/1966 | Jeschke | 252/62.56 |
| 3,720,618 | 3/1973 | Toda et al. | 252/62.56 |

FOREIGN PATENTS OR APPLICATIONS 505,751    9/1954    Canada.............................. 423/633

*Primary Examiner*—Jack Cooper
*Attorney, Agent, or Firm*—Burgess, Dinklage & Sprung

[57] ABSTRACT

In the production of acicular ferromagnetic iron oxides from acicular iron oxide hydroxide prepared by precipitating at least one of iron (II) hydroxide and carbonate from an aqueous iron (II) salt solution by the addition of an aqueous solution containing a stoichiometric excess of at least one of an alkali hydroxide and carbonate, oxidizing the precipitated product into iron oxide hydroxide, and separating the product of oxidation from the reaction medium, the improvement which comprises carrying out the oxidation of the precipitated iron hydroxide or carbonate at least partly at a temperature of about 45°C to 75°C, by passing a finely dispersed oxygen-containing gas through the solution at a volume (liter) ratio of from about 5:1 to 80:1 while stirring at an intensity such that the acicular iron oxide hydroxide accumulates in a volume-time yield of from about 6 to 25 g per liter per hour.

8 Claims, No Drawings

PRODUCTION OF ACICULAR MAGNETIC IRON OXIDES

This invention relates to a process for the production of acicular magnetic iron oxides which, following incorporation into a suitable binder of a magnetogram support, can be used for electromagnetically recording and reproducing all kinds of signals.

Acicular $\gamma$-$Fe_2O_3$ with a length-to-width ratio of the needles of from 5:1 to 15:1 and, in some cases, even up to 25:1, is today predominantly used as a magnetic material for recording signals, for example on tapes. Acicular $Fe_3O_4$ of the same shape can also be used although, in this case, the sensitivity of the material to atmospheric oxidation cannot always be completely eliminated, even after incorporation into a binder. These magnetic iron oxides are generally produced by dehydrating a non-magnetic acicular iron oxide hydroxide to form $\alpha$-$Fe_2O_3$ which is then reduced into $Fe_3O_4$ and/or subsequently re-oxidized into $\gamma$-$Fe_2O_3$. The magnetic properties of magnetic iron oxides obtained in this way are essentially determined by the shape and size of the particles. The requirements in respect of shape and size apply not only to the final $\gamma$-$Fe_2O_3$ or $Fe_3O_4$, but also to the iron oxide hydroxide used as starting material, generally $\alpha$-FeO(OH), because, under the conditions applied, the geometric form of the starting material remains intact during the conversion into the magnetic iron oxide. Accordingly, the magnetic properties of the $\gamma$-$Fe_2O_3$ or $Fe_3O_4$ are determined to a large extent by the geometry of the $\alpha$-FeO(OH)-particles from which it was produced.

The production of magnetic iron oxides from $\alpha$-FeO(OH) can be carried out by a number of processes in which the $\alpha$-FeO(OH) is formed either in an acid or in a strongly alkaline medium. In solid medium, part of the iron is precipitated with lyes with an iron (II) salt solution in the form of iron (II) hydroxide and the suspension of this $Fe(OH)_2$ is oxidized with air to form $\alpha$-FeO(OH) seeds. This is followed by hydrolysis and oxidation of the residual iron (II)-salt solution at pH of from 2 to 6 either in the presence of metallic iron (cf. U.S. Pat. Nos. 1,327,061 and 1,368,748) or by the gradual addition of a basic precipitant (cf. British Pat. No. 923,038 and German DOS No. 1,592,398). These processes give $\alpha$-FeO(OH) needles which often have heavy dendritic overgrowths of the $\alpha$-FeO(OH)-crystals in some cases. These overgrowths are carried forward even through the conversion to $\gamma$-$Fe_2O_3$ and cannot by completely eliminated even by extremely intensive grinding. This is particularly noticeable where this material is worked into a binder. The binder suspension must be ground for an extremely long period before dispersion is complete. Following application of the dispersion to a support and orientation of the acicular iron oxide particles in a magnetic field, squareness (Br/Bs-ratio) values of from 0.70 to 0.79 are obtained. Squareness has a considerable influence upon the sensitivity with which magnetic impulse recording can be carried out. Sensitivity increases with increasing Br/Bs. Accordingly, as high a Br/Bs ratio as possible should be sought (ideally Br/Bs = 1.0).

Acicular $\alpha$-FeO(OH) can also be produced by oxidizing an Fe(II)-hydroxide suspension with air in the presence of an excess of an alkaline solution. In such cases, it is important that the pH of the suspension be kept above pH 9 because undesirable cubic $Fe_3O_4$ is otherwise formed. With a relatively large excess of an alkaline solution in which the pH is at least 11, acicular $\alpha$-FeO(OH) is obtained under certain conditions. British Pat. No. 1,212,126 discloses a process for the production of acicular $\gamma$-$Fe_2O_3$ from an acicular $\alpha$-FeO(OH) produced in alkaline medium. In this case, the $\alpha$-FeO(OH) is formed by oxidizing at temperatures of from 30° to 45°C iron (II) hydroxide, formed by precipitating an iron (II)-salt solution on addition of an alkali hydroxide solution. Oxidation into the acicular $\alpha$-FeO(OH) is carried out at temperatures of from 30° to 45°C because, at higher temperatures, undesirable cubic $Fe_3O_4$ is occasionally obtained. The $\alpha$-FeO(OH) is formed in a volume-time yield (based on the final volume) of generally less than 4 g per liter per hour.

The object of the present invention is to provide an economical process for producing a highly uniform, acicular magnetic iron oxide which shows improved properties as a magnetic recording material. The iron oxide-hydroxide used as starting material for the magnetic iron oxide is produced in as high a volume-time yield as possible without formation of undesirable secondary magnetite products, and is as free as possible from dendritic overgrowths.

According to the invention, this is achieved by a process for the production of acicular ferromagnetic iron oxides by dehydrating an acicular iron oxide hydroxide, reducing the $\alpha$-$Fe_2O_3$ thus formed and optionally reoxidizing the $Fe_3O_4$ formed to give $\gamma$-$Fe_2O_3$, in which process the iron oxide hydroxide is obtained by adding a stoichiometric excess of an aqueous alkali hydroxide and/or alkali carbonate solution to an aqueous iron (II)-salt solution, optionally containing modifiers, oxidizing the iron (II) hydroxide and/or carbonate precipitated and separating from the reaction medium the acicular iron oxide hydroxide formed. The process is distinguished by the fact that the oxidation of the precipitated iron hydroxide or carbonate is carried out at least partially at temperatures above about 45°C and up to about 75°C, preferably at temperatures of about 50° to 65°C, the quantity of finely dispersed oxygen-containing gas per volume (liter) of the $Fe(OH)_2$ suspension per hour being adjusted to a ratio of about 5:1 to 80:1, preferably about 10:1 to 60:1, and the intensity of stirring being adjusted in such a way that the acicular iron oxide hydroxide accumulates in a volume-time yield of about 6 to 25 g, preferably about 8 to 21 g per liter per hour.

It has now been found that acicular magnetic iron oxides which have improved properties are obtained under the conditions according to the invention. The iron oxide hydroxide needles are not contaminated by cubic $Fe_3O_4$, show hardly any dendritic overgrowths and have a length-to-width ratio of about 10:1 to 40:1.

As already mentioned, a growth rate of from about 6 to 25 g/l/hour, preferably from 8 to 21 g/l/hour, is obtained during iron oxide hydroxide formation by the process according to the invention. Accordingly, pigment growth is much faster than is achieved in the conventional processes described above. This increase in growth rate can only be achieved with as fine as possible a dispersion of the oxygen-containing gas, for example air, used for oxidation. This is only achieved if the stirrer unit mixes the suspension intensively at a high peripheral speed and if the quantity of gas introduced for oxidation is adjusted in such a way but uniformly throughout the entire reaction vessel.

The larger is the surface-to-radius ratio of the individual gas bubbles, the more quickly oxidation of the iron (II)-hydroxide and/or carbonate deposit takes place. The high volume-time yield not only provides for a considerable increase in production but ensures that cubic $Fe_3O_4$, which cannot be used as starting material for acicular magnetic iron oxides, is not formed at the temperatures at which the process is carried out, namely at temperatures above about 45°C and up to about 75°C, preferably in the range of from about 50° to 65°C. At rates of oxidation of the iron oxide hydroxide of less than 6 g/l/hour, undesirable magnetic formation occurs at temperatures above 45°C. In addition, when operating in accordance with the invention, products are obtained which do not give rise to any difficulties during filtration and washing of the iron oxide hydroxide. For example, an $\alpha$-FeO(OH) with a particle size, as determined by X-ray photography on the (110)-reflection, of approximately 100 A is obtained at 25°C, whereas an $\alpha$-FeO(OH) with a particle size of 260 A is obtained during oxidation of the iron (II) hydroxide and/or carbonate deposit at 55°C. The iron oxide hydroxide needles produced in accordance with the invention also show extremely high stability in respect of their needle form during subsequent conversion into magnetic iron oxide by dehydration to $\alpha$-$Fe_2O_3$, optionally tempering this, reduction to $Fe_3O_4$ and/or reoxidation to $\gamma$-$Fe_2O_3$.

The acicular iron oxide hydroxide according to the invention is preferably prepared by adding and overstoichiometric quantity of an alkali hydroxide and/or alkali carbonate solution with vigorous stirring to an iron (II)-salt solution at temperatures above 45°C over a period of about 1 to 10 minutes during which time nitrogen is introduced into the iron (II)-salt solution thus precipitating the iron (II)-hydroxide or carbonate, subsequently oxidizing the suspended precipitate with finely dispersed air to form acicular iron oxide hydroxide, the ratio of oxygen input (liter) to volume of the $Fe(OH)_2$ suspension (liter) per hour being adjusted to form 5:1 to 80:1, preferably to form 10:1 to 60:1 the oxygen volume being calculated at standard conditions of temperature and pressure. The stirrer unit and the form of gas dispersion within the suspension should be selected in such a way as to give a volume-time yield of about 6 to 25 g of iron oxide hydroxide per liter per hour, preferably about 8 to 21 g per liter per hour, without any formation of undesirable $Fe_3O_4$. It is even possible, under particularly favorable gas dispersion conditions, to precipitate the iron (II) hydroxide and/or carbonate simply by introducing air so that it is accompanied by oxidation into iron oxide hydroxide without any traces, detected by chemical and X-ray analysis, of $Fe_3O_4$ in the end product.

$FeSO_4$.7 $H_2O$, $FeCl_2$.4 $H_2O$ or any other water-soluble iron (II)-salt can be used as the iron (II)-salt. Sodium hydroxide, potassium hydroxide or ammonium hydroxide can be used as the alkali hydroxide, while sodium carbonate, potassium carbonate or ammonium carbonate can be used as the alkali carbonate.

The concentration of the iron (II)-salt can vary within a wide range and is generally in the range of about 20 to 50 g of iron per liter. However, for economically utilizing the apparatus, it should preferably be sufficiently high that an iron oxide hydroxide concentration of greater than about 50 g/l is present on completion of the reaction. The concentration of the alkali hydroxide and/or carbonate should be adjusted in such a way that the reaction medium contains an at least 80 percent excess beyond the quantity of alkali required stoichiometrically for precipitating the iron (II) hydroxide or carbonate. Precipitation is preferably carried out in an inert atmosphere, obtained, for example, by introducing nitrogen or argon simultaneously, at temperatures above about 45°C up to 75°C, preferably at temperatures of from about 50°C to 65°C. The subsequent oxidation into acicular iron oxide hydroxide is either completely carried out at this precipitation temperature or, following oxidation of from about 10 to 50 percent of the iron (II) deposit at temperatures of above 45°C to 55°C, the remainder can be oxidized at temperatures of about 55°C to 75°C. On the other hand, in order to obtain certain needle sizes, it is even possible to precipitate and oxidize about 10 to 50 percent of the iron (II) hydroxide and/or iron carbonate suspensions at temperatures of from about 10°C to 45°C, and the remainder at temperatures above 45°C to 75°C. This procedure gives acicular iron oxide hydroxides which consist predominantly of yellow $\alpha$-FeO(OH) and which do not contain any undesirable, cubic magnetite. The acicular iron oxide hydroxides are found to have grown very uniformly and show hardly any dendritic overgrowths. Depending upon the production conditions selected, it is possible to produce specifically iron oxide hydroxide needles of a certain length in the range of about 0.1 to 2 $\mu$. For a given gas dispersion, the length of the needles is greater, the higher is the oxidation temperature and the concentration of iron (II)-salt. With increasing volume-time yield, the length decreases for a constant iron (II)-salt concentration and reaction temperature.

The properties of the iron oxide produced in accordance with the invention can be influenced by the incorporation in known manner of modifiers, preferably other metals, into the lattice of the iron oxide. The required metal ions, for example Co, Mn, Cr, Zn, Cu, Al, Sn, Pb, Ti, Cd, Mg, Ca, Sr or Li, may be added to the iron (II)-salt solution in the form of water-soluble salts, preferably sulfates or chlorides, and the acicular iron oxide hydroxide initially prepared as described and subsequently converted into a magnetic iron oxide by a reduction and/or re-oxidation. In general, the foreign metal content can be up to about 5 percent by weight. The coercive force of the material can be increased by incorporating cobalt into the magnetic iron oxide. For example, the incorporation of 2.2 percent by weight of Co into $\gamma$-$Fe_2O_3$ can give a coercive force of 520 Oersteds, whereas, for example, a small addition of a mixture of about 0.05 to 0.5 percent each of Cr, Mn, Zn, Ni, Ca and Pb greatly influences the shape of the iron oxide hydroxide needles and the conditions for conversion into magnetic iron oxides. Long, slender iron oxide hydroxide needles with a high length-towidth ratio of about 20:1 to 40:1 can be obtained in this way. At the same time, these products show greater temperature stability during the reduction of $\alpha$-$Fe_2O_3$ to $Fe_3O_4$ during the conversion into magnetic iron oxide. For the same reduction temperature, the modified needles are less disintegrated than unmodified needles.

In addition, crystal growth during conversion into magnetic iron oxide is greatly impeded. For example, a $\gamma$-$Fe_2O_3$ obtained by reduction of the iron oxide hydroxide at 380°C and subsequent oxidation, shows a particle size of 620A, as determined by X-ray analysis at the (220) reflection in the absence of the aforementioned modifiers, whereas a $\gamma$-$Fe_2O_3$ containing these modifiers has a particle size of 350 A when the same reduction temperature is used. In addition, it is possible, for example, to combine the increase in the coercive force achieved by the incorporation of cobalt with the influence upon particle form achieved by the incorporation of further metals in order to produce magnetic iron oxides suitable for special applications.

The improved magnetic iron oxide is eminently suitable for the production of magnetogram supports, such as tapes, discs, strips for films or punched cards etc. Production of the storage elements for recording magnetic impulses of any kind, such as acoustic signals, visible images or other types of information material, may be carried out by methods known per se. The ferromagnetic iron oxide, $\gamma$-$Fe_2O_3$ or $Fe_3O_4$, is suspended in a binder with the assistance of a suitable dispersant and is applied in at least one layer to a non-magnetic supporting material (cf. for example U.S. Pat. Nos. 3,150,995, 3,247,017, 3,216,846, 3,109,749, 2,956,955). Flexible or rigid materials, such as paper, plastics, ceramics to metals, can be used as the supporting materials. These materials in the required form, can be coated by known methods with a lacquer prepared from ferromagnetic pigment, binder, solvent and suitable dispersants. After coating, the material is dried, optionally with accompanying orientation of the acicular magnetic particles in a unidirectional magnetic field and, if desired, may subsequently be calendered.

Magnetogram supports containing the magnetic iron oxide produced in accordance with the invention show high Br/Bs ratios. It was possible to achieve Br/Bs values of up to 0.88, for example as measured on a tape. This increases the sensitivity with which recordings can be made by from 2 to 3 dB compared with conventional magnetic recording materials. In addition, an improvement in dispersibility is observed during the preparation of a lacquer with the magnetic iron oxide produced in accordance with the invention so that shorter grinding times can be used.

Production of the magnetic iron oxide used in accordance with the invention is described in Examples 1 to 8 below, the production of magnetogram supports being additionally described in Examples 3, 4 and 5. The percentages quoted in the description and in the Examples are percentages by weight unless otherwise indicated.

EXAMPLE 1 a. Preparation of iron oxide-hydroxide 9.4 liters of an iron (II) sulfate solution containing 136 g of $FeSO_4$/l were introduced into a 25 liter vessel. The contents of the vessel were then heated to 50°C with accompanying introduction of 200 liters of nitrogen per hour. Iron (II) hydroxide was precipitated at this temperature by the addition of 2.8 liters of an aqueous KOH-solution containing 660 g of KOH per liter over a period of 6 minutes with nitrogen. Thereafter, 350 liters of air per hour were initially introduced for a period of 15 minutes during which vigorous stirring was continued, followed by the introduction of 1 m³ of air per hour at the same temperature until oxidation was complete. The formation of iron oxide hydroxide was complete 3 hours after the iron (II)-hydroxide had been precipitated. The yellow product consisting of $\alpha$-FeO(OH), was filtered off, washed and dried.

Volume-time yield of iron hydroxide formation: 20.5 g per liter per hour.
Concentration of iron oxide hydroxide in the final suspension 61.4 g/l.
Length of the needles: 0.5 $\mu$.
Length-to-width ratio: approximately 25:1.

b. Conversion into magnetic iron oxide

Conversion of the acicular iron oxide hydrate into magnetic iron oxide was carried out by a known method as follows: dehydration of the iron oxide hydroxide at 380°C and subsequent reduction of the $\alpha$-$Fe_2O_3$ formed to the acicular $Fe_3O_4$ with hydrogen laden with water vapor at this temperature. The product was then left to cool to below 50°C in a stream of nitrogen resulting in the formation of acicular $Fe_3O_4$, or to only 300°C in a stream of nitrogen, with subsequent oxidation into $\gamma$-$Fe_2O_3$. Magnetic values of the powder:

| | | |
|---|---|---|
| $Fe_3O_4$: | remanence: | Br/$\rho$=485 G cc g$^{-1}$ |
| | coercive force: | $IH_c$=411 Oersteds |
| $\gamma$-$Fe_2O_3$: | remanence: | Br/$\rho$=480 G cc g$^{-1}$ |
| | coercive force: | $IH_c$=390 Oersteds. |

EXAMPLE 2

A solution of 14.2 liters of iron (II) sulfate containing 2,900 g of $FeSO_4$.7 $H_2O$ was introduced into a 25 liter vessel. The iron (II) hydroxide was precipitated at 25°C by the addition of 4.2 liters of a sodium hydroxide solution containing 1,750 g of NaOH over a period of 1 minute with accompanying vigorous stirring and introduction of 100 liters of air per hour. On completion of precipitation, air was introduced at this temperature for a further 45 minutes at a rate of 100 liters per hour. Thereafter, the suspension was heated to 70°C and the oxidation subsequently completed with 200 liters of air per hour. The formation of iron oxide hydroxide was complete 3 hours after the end of precipitation.

It was not possible to detect any $Fe_3O_4$ among the iron oxide hydroxide, $\alpha$-FeO(OH), either by chemical or by X-ray analysis.

Volume-time yield of iron oxide hydroxide formation: 16.7 g per liter per hour.
Conversion to iron oxide hydroxide after introduction of air for 45 minutes at 25°C: 41.8 percent.
Concentration of iron oxide hydroxide in the final suspension: 50.4 g/l.
Magnetic values after conversion into $\gamma$-$Fe_2O_3$:
Br/$\rho$ = 467 G cc g$^{-1}$
$IH_c$ = 407 Oersteds.

EXAMPLE 3

In a 500 liter vessel, 185 liters of a sodium hydroxide solution containing 180 g of NaOH per liter were added to 145 liters of an $FeSO_4$ solution containing 220 g of $FeSO_4$ per liter over a period of 5 minutes at 50°C with accompanying vigorous stirring and introduction of 1 m³ of nitrogen per hour, Fe(OH)$_2$ being precipitated. Thereafter, 1 m³ of air per hour was introduced at this temperature for a period of 30 minutes, after which the contents of the vessel were heated to 65°C with 8 m³ of air per hour and, after this temperature had been reached, the iron was further oxidized with this quantity of air until the reaction was complete. Oxidation was complete after 3 hours.

Volume-time yield of iron oxide hydroxide formation: 18.2 g per liter per hour.
Conversion to iron oxide hydroxide after introduction of air for 30 minutes at 50°C: 43 percent.
Concentration of iron oxide hydroxide in the final suspension 56.5 g per liter.
Length of the iron oxide hydroxide needles: approximately 1 $\mu$.
Length-to-width ratio 20:1.
Magnetic values after conversion into $\gamma$-$Fe_2O_3$:
  Remanence: $Br/\rho = 444$ G cc $g^{-1}$.
  Coercive force: $IH_c = 427$ Oersteds.

144 g of the $\gamma$-$Fe_2O_3$ described above were stirred with 9.7 g of a copolymer of polyvinyl chloride and polyvinyl acetate (85:15 parts by weight, $\rho = 1.36$ g $cm^{-3}$) in a mixture of 115 ml of butyl acetate, 2.4 ml of oleic acid and 324 ml of ethyl acetate to form a dispersion which was then ground for 24 hours in a vibratory mill. After grinding, 15.2 g of a polyester of 3 moles of adipic acid, 2 moles of 1,3-butane diol and 2 moles of hexane triol ($\rho = 1.12$ g $cm^{-3}$) were added to adjust a pigment-volume-concentration of 42 percent. A 23 $\mu$ thick polyester film was coated with the lacquer, the $\gamma$-$Fe_2O_3$ being applied in a quantity of 20 g/$m^{-2}$. During drying the acicular magnetic iron oxide was oriented in a magnetic field. A layer approximately 12 to 14 $\mu$ thick was obtained after drying.

Squareness on the tape: $Br/Bs = 0.825$.

EXAMPLE 4

Iron (II) hydroxide was precipitated at 50°C as described in Example 3 by pouring 138 liters of a sodium hydroxide solution containing 390 g of NaOH per liter into 312 liters of a commercial-grade $FeSO_4$ solution containing 150 g of $FeSO_4$ per liter. Thereafter, air was introduced for 60 minutes at this temperature at a rate of 1 $m^3$ per hour, after which the contents of the vessel were heated to 60°C, the input of air being maintained. After this temperature had been reached, air was introduced at the rate of 6 $m^3$ per hour until the reaction was over (total reaction time 5 hours). The product consisted of acicular yellow $\alpha$-FeO(OH).

Volume-time yield: 12.1 g per liter per hour.
Conversion to iron oxide hydroxide after introduction of air for 60 minutes at 50°C: 16.5 percent.
Concentration of iron oxide hydroxide in the final suspension: 60.5 g per liter.
Magnetic values after conversion into $\gamma$-$Fe_2O_3$:
  Remanence: $Br/\rho = 430$ G cc $g^{-1}$
  Coercive force: $IH_c = 391$ Oersteds.

Processing into magnetic tape as described in Example 3 gave a Br/Bs ratio of 0.86 on the tape. The $\gamma$-$Fe_2O_3$ contained 0.1% by weight of manganese.

EXAMPLE 5

A caustic liquor-$FeCl_2$-solution containing in addition to $FeCl_2$ small quantities of additional dissolved metals (g of metal per liter: 1,4 g of Zn, 0.86 g of Mn, 0.37 g of Cr, 0.33 g of Pb, 0.15 g of Ni) was used for this Example. 120 liters of a sodium hydroxide solution containing 415 g of NaOH per liter were added to 280 liters of this $FeCl_2$-solution containing 140 g of $FeCl_2$ per liter over a period of 5 minutes at 50°C as described in Example 3. Thereafter, air was introduced at a rate of 1 $m^3$ per hour for a period of 90 minutes at 50°C with stirring, as previously described. Thereafter, the contents of the vessel were heated to 60°C, as described in Example 4, and oxidation completed at this temperature, air being introduced at a rate of 6 $m^3$ per hour. The reaction was complete 7 hours after the iron hydroxide had been precipitated.

Volume-time yield: 9.8 g per liter per hour.
Conversion to iron oxide hydroxide after introduction of air for 90 minutes at 50°C: 26.5 percent.
Concentration of iron oxide hydroxide [$\alpha$-FeO(OH)] in the final suspension: 68.6 g/l.
Length of the $\alpha$-FeO(OH) needles: 1 $\mu$.
Length-to-width ratio: approximately 35:1.

The $\alpha$-FeO(OH) needles showed no dendritic overgrowths. Conversion of the iron oxide hydroxide to $\gamma$-$Fe_2O_3$ by a process differing from that described in Example 1 in that the reduction was effected at 420°C gave the following magnetic values on the $\gamma$-$Fe_2O_3$ powder:
  Remanence: $Br/\rho = 429$ G cc $g^{-1}$.
  Coercive force: $IH_c = 360$ Oersteds.

Processing into magnetic tape as described in Example 3 gave a Br/Bs ratio of 0.88 on the tape. The $\gamma$-$Fe_2O_3$ contained the following modifiers, in the following quantities, based on the weight of the $\gamma$-$Fe_2O_3$: 0.51% of Zn; 0.33% of Mn; 0.13% of Pb; 0.12% of Cr; 0.05% of Ni.

EXAMPLE 6

Following the procedure described in Example 1, 2.8 liters of a sodium hydroxide solution containing 1,220 g of NaOH are added to 9.4 liters of an iron (II) sulfate solution containing 1,910 g of $FeSO_4.7$ $H_2O$ and 50.5 g of $CoCl_2.6$ $H_2O$ over a period of 6 minutes at 25°C, and the cobalt-containing iron (II) hydroxide precipitated. Thereafter, air is introduced at this temperature for a period of 30 minutes at a rate of 250 liters per hour. The contents of the vessel are then heated to 60°C with this quantity of air and, after this temperature has been reached, the input of air increased to 350 liters per hour. Oxidation is terminated after approximately 5 hours, leaving a light brown product.

Volume-time yield: 10.3 g per liter per hour.
Conversion to iron oxide hydroxide after introduction of air for 30 minutes at 25°C: 49.5 percent.
Concentration of cobalt-containing iron oxide hydroxide in the final suspension: 51.5 g/liter.
Length of the cobalt-containing iron oxide hydroxide needles: 0.3 to 0.5 $\mu$.
Length-to-width ratio: 20 : 1.
Magnetic values after conversion of the cobalt-containing iron oxide hydroxide into a cobalt-containing $\gamma$-$Fe_2O_3$ as described, in Example 1 the reduction being effected at 400°C and the reoxidation at 260°C:
  Remanence: $Br/\rho = 505$ G cc $g^{-1}$
  Coercive force: $IH_c = 520$ Oersteds.

EXAMPLE 7

Following the procedure described in Example 2, iron carbonate is precipitated by the addition of 50°C of 8.2 liters of a sodium carbonate solution containing 1910 g of $Na_2CO_3$ to 10 liters of an $FeSO_4$-solution containing 2860 g of $FeSO_4.7 H_2O$ nitrogen being simultaneously introduced into this at a rate of 100 liters per hour. Thereafter, air is introduced at this temperature for a period of 30 minutes at a rate of 100 liters per hour. The contents of the vessel are then heated to 70°C with this input of air and, after this temperature has been reached, the input of air increased to 200 liters per hour. Oxidation is complete after 2 hours.

Volume-time yield: 25 g per liter per hour.
Conversion to iron oxide hydroxide after introduction of air for 30 minutess at 50°C: 34,1 percent.
Concentration of iron oxide hydroxide in the final suspension: 50.3 g/l.
Several of the individual needles are joined together.
Length of the individual iron oxide hydroxide needles: 0.5 $\mu$.
Length-to-width ratio: 25 : 1.
Magnetic values after conversion in accordance with Example 1 by reduction at 400°C:
Remanence: $Br/\rho = 328$ G cc $g^{-1}$
Coercive force: $IH_c = 324$ Oersteds.

EXAMPLE 8

Following the procedure described in Example 7, iron (II) is precipitated at 50°C from 10 liters of an $FeSO_4$-solution containing 2,860 g of $FeSO_4.7 H_2O$ by the addition of 8.2 liters of an aqueous solution containing 1,270 g of NaOH and 555 g of $Na_2CO_3$. Oxidation is then carried out at this temperature by the introduction of air at a rate of 100 liters per hour. The formation of iron oxide hydroxide was complete after 6 hours, leaving a yellow product.

Volume-time yield: 8.4 g per liter per hour.
Magnetic values after conversion as described in Example 7
Remanence: $Br/\rho = 428$ G cc $g^{-1}$
Coercive force: $IH_c = 369$ Oersteds.

It will be appreciated that the instant specification and examples are set forth by way of illustration and not limitation and that various modifications and changes may be made without departing from the spirit and scope of the present invention.

What is claimed is:

1. In the production of acicular γ-ferromagnetic iron oxide needles from acicular iron oxide hydroxide needles prepared by precipitating at least one of iron (II) hydroxide and carbonate from an aqueous iron (II) salt solution by the addition of an aqueous solution containing a stoichiometric excess of at least one of an alkali hydroxide and carbonate, oxidizing the precipitated product into acicular α-iron oxide hydroxide under conditions which form the needles without formation of cubic crystals, separating the product of oxidation from the reaction medium, dehydrating the α-iron oxide hydroxide, reducing the resultant α-$Fe_2O_3$ to $Fe_3O_4$ and oxidizing the $Fe_3O_4$ to α-$Fe_2O_3$, the improvement which comprises carrying out the oxidation of the precipitated iron hydroxide or carbonate by passing a finely dispersed oxygen-containing gas through the solution at a volume ratio of from about 5:1 to 80:1 while stirring at an intensity such that the acicular iron oxide hydroxide accumulates in a volume-time yield of from about 6 to 25 g per liter per hour, about 10 to 50 percent of the iron (II) deposit being oxidized to the iron oxide hydroxide at about 10° to 55°C and the balance being oxidized at about 55° to 75°C., the resulting iron oxide hydroxide being substantially free of $Fe_3O_4$.

2. The process of claim 1, in which the iron (II) salt is at least one of iron (II) sulfate and chloride.

3. The process of claim 1, in which the alkali of the alkali hydroxide or carbonate is at least one of sodium, potassium and ammonium.

4. The process of claim 1, in which the iron oxide hydroxide is prepared in a volume-time yield of about 8 to 21 g per liter per hour.

5. The process of claim 1, in which the iron (II) hydroxide or carbonate is precipitated at a temperature of about 10° to 55°C and oxidation of the 10 to 50% iron (II) deposit into the iron oxide hydroxide is carried out at temperatures of about 45°C to 55°C.

6. The process of claim 1, in which the precipitation of the iron (II) oxide or carbonate is effected in an inert atmosphere.

7. The process of claim 1, in which a water-soluble salt of at least one metal selected from the group consisting of cobalt, manganese, chromium, zinc, copper, lead, nickel, aluminum, tin, titanium, antimony, cadmium, magnesium, calcium, strontium and lithium is added to the iron (II) salt in such quantities that the magnetic iron oxide formed contains about 0.05 to 5 percent by weight of the metal.

8. The process of claim 7, in which the iron (II) salt is at least one of iron (II) sulfate and chloride and the alkali of the alkali hydroxide or carbonate is at least one of sodium, potassium and ammonium, the precipitation being effected in an inert atmosphere at a temperature of about 10° to 55°C, the volume ratio being about 10 : 1 to 60 : 1 and the volume-time yield being about 8 to 21 g per liter per hour.

* * * * *

UNITED STATES PATENT AND TRADEMARK OFFICE
CERTIFICATE OF CORRECTION

PATENT NO. : 3,912,646
DATED : October 14, 1975
INVENTOR(S) : Lutz Leitner et al It is certified that error appears in the above--identified patent and that said Letters Patent are hereby corrected as shown below:

Column 2, line 67  After "way" insert --that fine gas bubbles are distributed not only at one point--.

Column 7, line 24  After "cm" cancel "116 3" and substitute --$^{-3}$--.

Column 9, line 14  Correct spelling of "minutes".

Signed and Sealed this eleventh Day of May 1976

[SEAL]

Attest:

RUTH C. MASON
Attesting Officer

C. MARSHALL DANN
Commissioner of Patents and Trademarks